US010887824B2

(12) United States Patent
Jia

(10) Patent No.: US 10,887,824 B2
(45) Date of Patent: Jan. 5, 2021

(54) PROTECTIVE RESPONSE TO FAILED NETWORK ATTACH OPERATIONS

(71) Applicant: AT&T INTELLECTUAL PROPERTY I, L.P., Atlanta, GA (US)

(72) Inventor: Yupeng Jia, Austin, TX (US)

(73) Assignee: AT & T INTELLECTUAL PROPERTY I, L.P., Atlanta, GA (US)

( * ) Notice: Subject to any disclaimer, the term of this patent is extended or adjusted under 35 U.S.C. 154(b) by 85 days.

(21) Appl. No.: 16/038,116

(22) Filed: Jul. 17, 2018

(65) Prior Publication Data

US 2020/0029269 A1   Jan. 23, 2020

(51) Int. Cl.
| | | |
|---|---|---|
| *H04W 56/00* | (2009.01) | |
| *H04W 48/06* | (2009.01) | |
| *H04W 8/24* | (2009.01) | |
| *H04W 48/04* | (2009.01) | |
| *H04W 76/18* | (2018.01) | |

(52) U.S. Cl.
CPC .............. *H04W 48/06* (2013.01); *H04W 8/24* (2013.01); *H04W 48/04* (2013.01); *H04W 76/18* (2018.02)

(58) Field of Classification Search
CPC ....... H04W 48/06; H04W 76/18; H04W 8/24; H04W 48/04
USPC .......................................................... 370/230
See application file for complete search history.

(56) References Cited

U.S. PATENT DOCUMENTS

| | | |
|---|---|---|
| 9,426,687 B2 | 8/2016 | Liao |
| 9,648,515 B2 | 5/2017 | Velev et al. |
| 9,713,055 B2 | 7/2017 | Kim et al. |
| 2004/0193943 A1* | 9/2004 | Angelino ............ H04L 41/0631 714/4.1 |
| 2006/0268680 A1* | 11/2006 | Roberts ............... H04L 43/0811 370/216 |
| 2009/0271504 A1* | 10/2009 | Ginter ................... G06F 21/554 709/220 |
| 2010/0182123 A1* | 7/2010 | Press ....................... G07C 1/10 340/5.28 |
| 2013/0329638 A1* | 12/2013 | Ren ...................... H04W 60/005 370/328 |
| 2015/0065055 A1* | 3/2015 | Newham ............... H04M 19/04 455/41.3 |
| 2017/0289042 A1* | 10/2017 | Niemi ..................... H04L 47/12 |

(Continued)

FOREIGN PATENT DOCUMENTS

WO   2018008944 A1   1/2018

*Primary Examiner* — Sai Ming Chan
(74) *Attorney, Agent, or Firm* — Amin, Turocy & Watson, LLP

(57) ABSTRACT

Technology to protect a network, e.g., a 5G/NGC network, including standalone RAN option 2 or option 4 network architectures, from aggressive device behavior is disclosed. A protective state can be entered in response to a criterion being determined to satisfy a rule related to failed network attachment attempts. While in the protective state, subsequent attach attempts can be prevented or blocked to reduce a burden on resources of the network, resources of a device attempting to attach to the network, etc. The protective state can be exited in response to another criterion being determined to satisfy another rule related to revoking the protective state. The other criterion can be related to time, location, device movement, an override signal, attachment to another network, a change in device power state, a change in device radio power state, etc.

20 Claims, 10 Drawing Sheets

(56) References Cited

U.S. PATENT DOCUMENTS

| | | |
|---|---|---|
| 2017/0332192 A1 | 11/2017 | Edge |
| 2017/0332372 A1 | 11/2017 | Lee et al. |
| 2017/0332424 A1 | 11/2017 | Salot et al. |
| 2018/0020418 A1 | 1/2018 | Chandramouli et al. |
| 2018/0083688 A1* | 3/2018 | Agiwal ............. H04W 12/0013 |
| 2018/0092085 A1 | 3/2018 | Shaheen et al. |
| 2018/0098311 A1 | 4/2018 | Hong et al. |
| 2018/0132141 A1 | 5/2018 | Huang-Fu et al. |

* cited by examiner

PROTECTIVE RESPONSE TO FAILED NETWORK ATTACH OPERATIONS

TECHNICAL FIELD

The disclosed subject matter relates to responding to repeated network attach operations and, more particularly, to limiting subsequent network attach attempts in response to a determined number of failed network attach operations.

BACKGROUND

Next-generation mobility networks, including 5G cellular networks and systems, are anticipated to enable disruptive digital transformation in the society that will enable people, machines, businesses and governments with unprecedented capabilities to communicate and share information effectively. Beyond the cutting-edge radio access technologies, 5G aims to integrate cross-domain networks so that service providers can offer network-on-demand as a service. With the advances in 5G, new mobility services, convergence of fixed and rich mobile services across several industry verticals and new services-revenue-business models can be enabled. The demands on 5G can be high in terms of handling a variety of use cases associated with mobile-to-mobile and the 'internet of things' (M2M/IoT), augmented/virtual reality (AR/VR), telehealth, targeted mobile advertising, connected cars etc. These new services can require a wide range of aggregate bit rates, low latencies, vehicular speeds, device types and device capabilities, device densities, etc., to provide consistent end user quality for a given service in heterogeneous environment.

DETAILED DESCRIPTION

Figure 1:
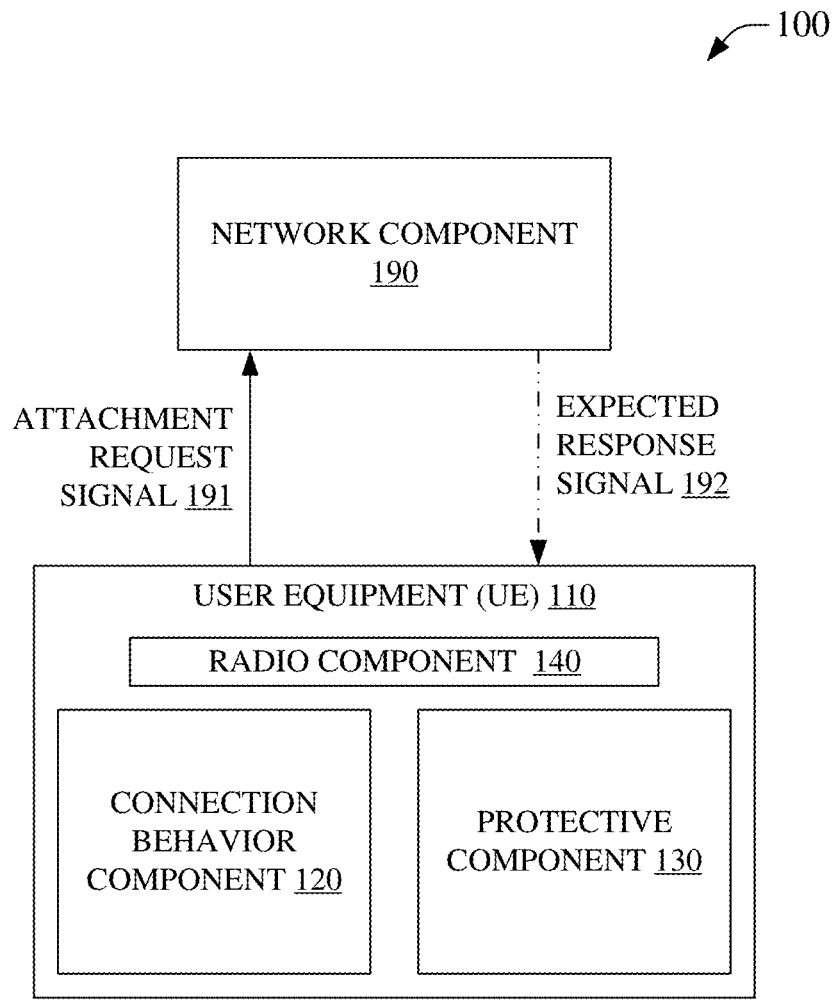
FIG. 1 is an illustration of an example system that can facilitate initiating a protective response to a failed network attach operation, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

The continued evolution of mobility networks such as 5G cellular networks and beyond, will likely transformation society by providing unprecedented communication capabilities to more devices than ever before. Service providers will be able to provide networks tailored to determined parameters and will enable efficient spectrum use while providing improved functionality. This application, for the sake of clarity and brevity, will generally disclose 5G network aspects, but the disclosed subject matter can be employed in other modern or future networks and, accordingly, claims directed to the disclosed subject matter in regards to other modern or future networks are to be considered within the scope of the present disclosure even where not explicitly recited. In an aspect, network operators can deploy 5G networks with a standalone (SA) radio access network option, for example, option 4, option 2, etc., such as are defined in, "Study on New Radio Access Technology: Radio Access Architecture and Interfaces," 3GPP technical specification 38.801, see http://www.3gpp.org/. In an example 5G architecture, such as an 'option 2' 5G architecture, a 5G access network edge component can be connected to a next generation core (NGC) component. A 5G access network edge component user plane connection to the NGC can be via a 5G radio access network (RAN) node, e.g., a 'gNB', etc. Generally, signaling is via a 5G new radio (5G NR) component of the 5G access network edge component. Similarly, data services can be set up via the 5G NR component as a bearer for 5G data.

In an aspect, devices can attempt to attach to a network, e.g., via a 5G NR component, which can be an access network edge device or comprised in an access network edge device, such as, a 'gNB'. In a long term evolution (LTE) network environment an access network edge device can be an evolved NodeB (eNodeB) component, etc. In a 3G network environment an access network edge device can be a NodeB component, etc. In an aspect the 5G NR component can allow a device, user equipment (UE), or other component, to interact with or communicate with a core network device, e.g., a NGC component, etc. Where attachment of the requesting device to the 5G NR component occurs, communication can be facilitated in accord with 5G technologies. However, where attachment of the device to the network, e.g., via the 5G NR component, etc., fails, the device can begin to repeat the attachment request behavior. This can be termed 'aggressive device behavior'.

Aggressive device behavior can be problematic, for example creating unnecessary spectral noise, consuming power unnecessarily, consuming processing cycles related to processing each subsequent attachment request, etc. As such, it can be desirable to manage aggressive device behavior and to have in place a prophylactic or protective technology, technique, device, component, etc. Unlike earlier network technologies, 5G and other modern/future networks aim to connect vast numbers of devices that will far outnumber conventional telephonic-type communications devices that are typically the bulk of devices on pre-5G networks. As an example, smartphones can be the bulk of traffic on LTE networks, however, smartphones on a 5G network can be far outnumbered by internet-of-things (TOT) devices, sensors, etc. As such, where the for a given percentage of aggressive devices, the effect in an older network can be substantially less impactful in comparison to the same percentage of aggressive devices in a 5G or later network, for example, because the sheer numbers of total devices can be so much larger, radio access network (RAN) devices can be higher in number but lower in capacity, the frequency of attach requests can be greater given the typically higher device count, etc. Where device numbers scale, without appropriate network protection procedures, network performance can degrade, a network can crash, etc. In an aspect, the present disclosure can prevent, or mitigate the effect of, devices repeatedly requesting attachment to a 5G NR component networks, e.g., a device can repeatedly request attachment where a current attachment request fails, e.g., a 5G NR component can be overloaded or out-of-service, a 5G NR component can be restricting access based on an access rule, etc.

In an aspect, the disclosed subject matter can relate to a protective or prophylactic state that can prevent subsequent attachment/connection attempts. The prevention of subsequent attachment attempts can continue for a determined period, until a condition is met, while a rule is determined to be satisfied, etc. A default time period can be designated, for example 5 seconds, 60 seconds, five minutes, one hour, one day, etc. Moreover, the time period can be altered via received command, such as a command changing the default period form a first time to a second time. In some embodiments, the command can be received via a network connection, for example in a successful attachment, the default time can be changed to a second time by a command received via the network such that, in a future failed attempt, the second time value can be used to determine the period of the prophylactic response.

In some embodiments, a default service request count can be designated, for example 5 consecutively failed service connection attempts, etc. Moreover, the default service request count can be altered via received command, such as a command changing the default service request count form a first count to a second count, from a first default count to a second default count, from a first default count to a second count, etc. In some embodiments, the command can be received via a network connection, for example in a successful attachment, the default service request count can be changed to a second count by a command received via the network such that, in a future failed attempt, the second service request count can be used to determine that the prophylactic response can be initiated.

In some embodiments, radio resource connection count can be designated, for example 5 consecutively failed radio resource connection attempts, etc. Moreover, the default service request count can be altered via received command, such as a command changing the default radio resource connection count form a first count to a second count, from a first default count to a second default count, from a first default count to a second count, etc. In some embodiments, the command can be received via a network connection, for example in a successful attachment, the default radio resource connection count can be changed to a second count by a command received via the network such that, in a future failed attempt, the second radio resource connection count can be used to determine that the prophylactic response can be initiated.

In some embodiments, the modified values, e.g., the time period, the service request count, the radio resource connection count, etc., can be returned to default values. The return to default can be based on states of a user device, UE, attaching device, etc., for example, a power state, an 'airplane-mode' state, an override value state, a location state, a geographic transition state, etc. In an aspect, this can allow a network to change from the default value to a second value in a manner that allows device states to return the device to a default value. It will be noted that the default value itself can be updated, e.g., via the network, from a first default value to a second default value, wherein the aforementioned reset state can result in returning from a second value to a second default value rather than to the first default value. The return to a default value can allow the network to direct the period of prophylactic response while allowing a device to return to a default state under certain conditions. This can be useful, for example, where a device moves form a first network provider region to a second network provider region, e.g., a location state change triggering a return to a default value, such that the first network operator designated delay period isn't forced upon the second network operator. Numerous other examples are readily appreciated and are within the scope of the instant disclosure despite not being explicitly recited for the sake of clarity and brevity.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate initiating a protective response to a failed network attach operation, in accordance with aspects of the subject disclosure. System 100 can comprise a device, such as user equipment (UE) 110. In some embodiments, the device can be a device other than UE 110, however, such examples are not illustrated for the sake of clarity and brevity, although all such embodiments are within the scope of the presently disclosed subject matter even where not expressly recited. UE 110 can attempt to attach to a network via network component 190. The attempt to attach UE 110 to the network can comprise enabling access by network component 190 to attachment request signal 191. In an embodiment, attachment request signal 191 can be accessed in a transmission, e.g., via radio component 140 of UE 110, etc. Where UE 110 successfully attached to the network via network component 190, expected response signal 192 can be returned. However, where the attaching of UE 110 to the network fails, expected response signal 192 can be absent. The attachment of UE 110, via network component 190, to a network can fail for nearly any reason, e.g., network component 190 can be underperforming, overburdened, filtering or otherwise selectively allowing attachment based on a determined criterion, etc.

Connection behavior component 120 of system 100 can determine that the attaching of UE 110 to the network has failed. In an embodiment, connection behavior component 120 can indicate a count of failed attachment attempts. In another embodiment, connection behavior component 120 can indicate a type of attachment attempted and failed. In a further embodiment, connection behavior component 120 can indicate a time since a last successful attachment attempt. It is noted that one or more of the herein disclosed embodiments can be combined without departing for the scope of the presently disclosed subject matter, e.g., an embodiment can of connection behavior component 120 can indicate a count and type of failed attachment attempts, another embodiment of connection behavior component 120 can indicate a count and/or type of failed attachment attempts and a time since a last successful attachment attempt, etc.

Protective component 130 of system 100 can cause a protective or prophylactic state that can prevent subsequent attachment attempts. The protective or prophylactic state can be initiated or caused in response to a signal from connection behavior component 120, e.g., a count of failed attempts is determined to satisfy a rule related to initiating the protective or prophylactic state. The prevention of subsequent attachment attempts can continue for a determined period, until a condition is met, while a rule is determined to be satisfied, etc. As an example, where protective component 130 causes a protective state, UE 110 can forestall further attachment attempts for a default time period, etc.

In an embodiment, UE 110 can comprise connection behavior component 120 and/or protective component 130, as illustrated. In other embodiments, connection behavior component 120 and/or protective component 130 can be comprise in another device. In an aspect, this other device can be local or remote to UE 110. As an example, connection behavior component 120 and/or protective component 130 can be comprised in a remote server device. In another example, connection behavior component 120 and/or protective component 130 can be comprised in network component 190. In a further example, connection behavior component 120 and/or protective component 130 can be comprised in another device proximate to UE 110, such as a laptop computer proximate to UE 110 can store an application that attempts to access the network via a tethered connection from the laptops computer to UE 110 and attempting to attach to the network via network component 190, wherein the application can comprise connection behavior component 120 and/or protective component 130 such that where the application can initiate the prophylactic response, via protective component 130, based on a the failed attachment attempts indicated via connection behavior component 120.

Figure 2:
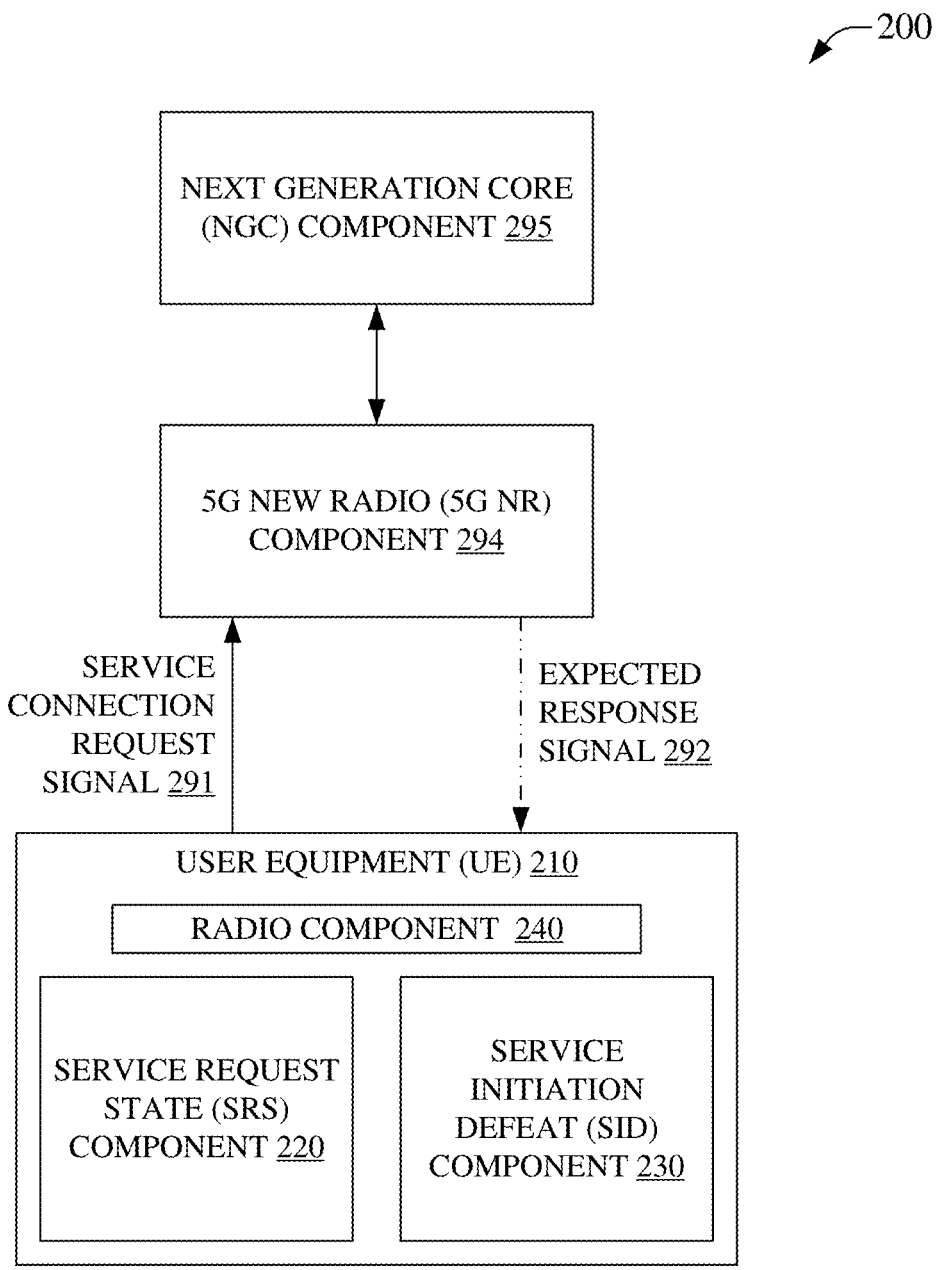
FIG. 2 is an illustration of an example system that can facilitate disabling, for a period, network attach attempts in response to a determined number of failed service requests, in accordance with aspects of the subject disclosure.

FIG. 2 is an illustration of a system 200, which can enable disabling, for a period, attempts to connect to a service via a network in response to a determined number of failed service requests, in accordance with aspects of the subject disclosure. System 200 can comprise a device, e.g., UE 210. UE 210 can attempt to connect to a service via a network, e.g., UE 210 can attempt to connect to a service via attaching to a next generation component (NGC) component 295 via a network edge component, e.g., 5G NR component 294, etc. The attempt to connect to a service can fail for various reasons that can comprise a failure of UE 210 to attach to 5G NR component 294, a failure of 5G NR component 294 to attach to NGC component 295, a failure of NGC component 295 to connect to the service, combinations of thereof, etc. Furthermore, attachment of UE 210 to a network can also fail other reasons, e.g., 5G NR component 294 and/or NGC component 295 can be underperforming, overburdened, filtering or otherwise selectively allowing attachment based on a determined criterion, etc. UE 210 can attempt to attach to the network via service connection request signal 291. In an embodiment, service connection request signal 291 can be accessed in a transmission, e.g., via radio component 240 of UE 210, etc. Where UE 210 successfully attaches to the network, expected response signal 292 can be returned. However, where the attaching of UE 210 to the network fails, expected response signal 292 can be absent.

Service request state (SRS) component 220 of system 200 can determine that an attempt to connect to a service has failed. In an embodiment, SRS component 220 can indicate a count of failed service connection attempts, a type of the failed service connection attempted, a time since a last successful connection to the service, etc.

Service initiation defeat (SID) component 230 of system 200 can cause a protective or prophylactic state that can prevent subsequent attempts to connect to the service via the network. The protective or prophylactic state can be initiated or caused in response to a signal from connection behavior component 220, e.g., a count of failed service connection attempts is determined to satisfy a rule related to initiating the protective or prophylactic state. The prevention of subsequent attempts to connect to the service can continue for a determined period, until a condition is met, while a rule is determined to be satisfied, etc. As an example, where SID component 230 causes a protective state, UE 210 can forestall further attempts to connect to the service for a default time period, until an override signal is received, etc. In an embodiment, UE 210 can comprise SRS component 220 and/or SID component 230, as illustrated. In other embodiments, SRS component 220 and/or SID component 230 can be comprised in another device that can be local or remote to UE 210.

Figure 3:
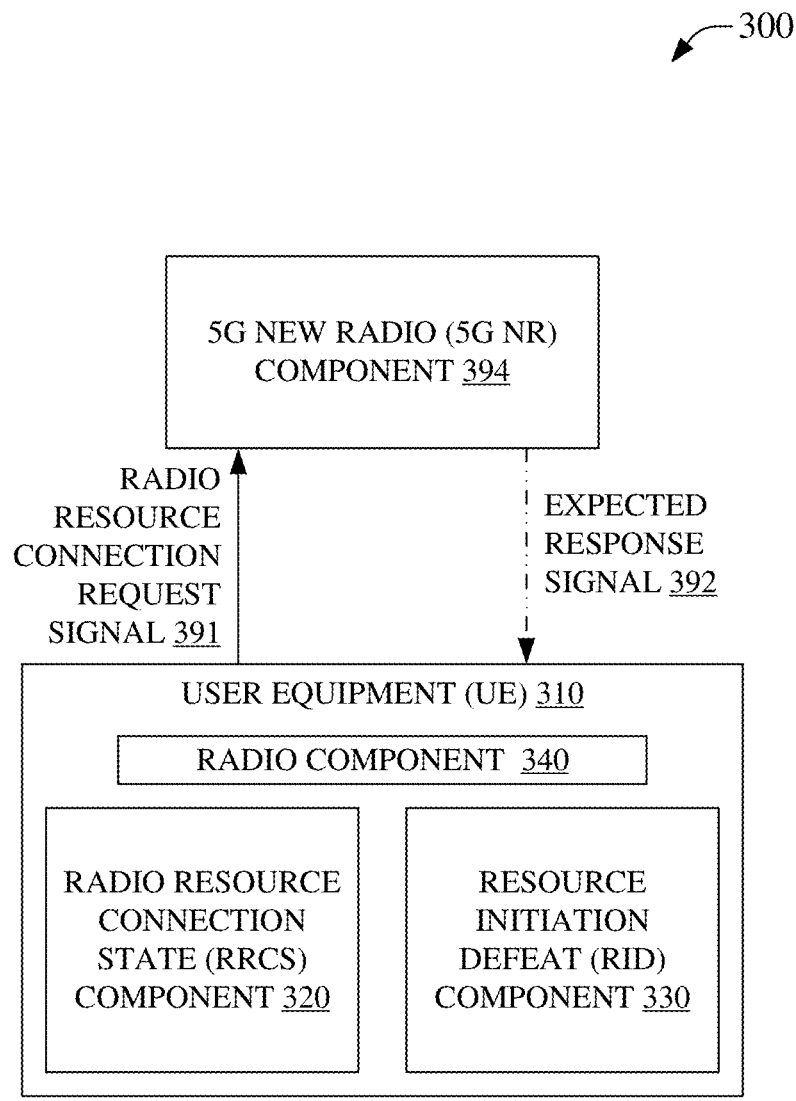
FIG. 3 is an illustration of an example system that can enable disabling, for a period, network attach attempts in response to a determined number of failed radio resource connection requests, in accordance with aspects of the subject disclosure.

FIG. 3 is an illustration of a system 300, which can facilitate disabling, for a period, network attach attempts in response to a determined number of failed radio resource connection requests, in accordance with aspects of the subject disclosure. System 300 can comprise UE 310. UE 310 can attempt to connect to a radio resource via a network edge component, e.g., 5G NR component 394, etc. The attempt to connect to a radio resource can fail for various reasons that can comprise a failure of UE 310 to attach to 5G NR component 394, a failure of 5G NR component 394 to connect to a determined radio resource, 5G NR component 394 underperforming, 5G NR component 394 being overburdened, 5G NR component 394 filtering or otherwise selectively allowing a connection to a radio resource based on a determined criterion, etc., and the like. UE 310 can attempt to connect to the radio resource via radio resource connection request signal 391. In an embodiment, radio resource connection request signal 391 can be accessed in a transmission, e.g., via radio component 340 of UE 310, etc. Where UE 310 successfully connects to the determine radio resource, expected response signal 392 can be returned. However, where the attaching of UE 310 to the network fails, expected response signal 392 can be absent.

Radio resource connection state (RRCS) component 320 of system 300 can determine that an attempt to connect to a radio resource has failed. In an embodiment, RRCS component 320 can indicate a count of failed radio resource connection attempts, a type of the failed radio resource connection attempted, a time since a last successful connection to the determined radio resource, etc.

Resource initiation defeat (RID) component 330 of system 300 can cause a protective or prophylactic state that can prevent subsequent attempts to connect to the radio resource. The protective or prophylactic state can be initiated or caused in response to a signal from connection behavior component 320, e.g., a count of failed radio resource connection attempts is determined to satisfy a rule related to initiating the protective or prophylactic state. The prevention of subsequent attempts to connect to the service can continue for a determined period, until a condition is met, while a rule is determined to be satisfied, etc. As an example, where RID component 330 causes a protective state, UE 310 can forestall further attempts to connect to the radio resource for a default time period, until an override signal is received, etc. In an embodiment, UE 310 can comprise RRCS component 320 and/or RID component 330, as illustrated. In other embodiments, RRCS component 320 and/or RID component 330 can be comprised in another device that can be local or remote to UE 310.

Figure 4:
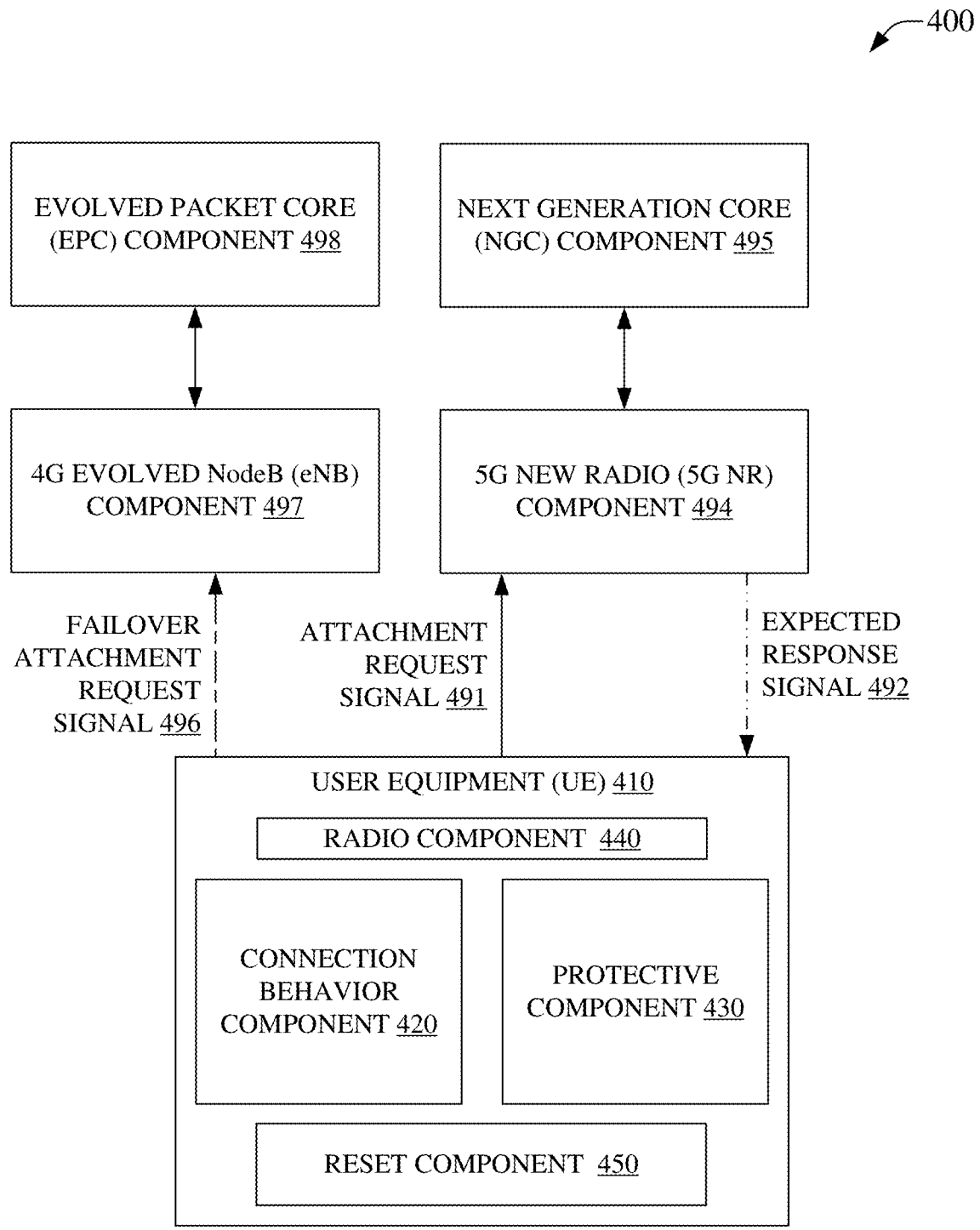
FIG. 4 illustrates an example system that can facilitate altering a protective response state, in accordance with aspects of the subject disclosure.

FIG. 4 is an illustration of a system 400, which can enable altering a protective response state, in accordance with aspects of the subject disclosure. System 400 can comprise UE 410. UE 410 can attempt to attach to a network. As an example, UE 410 can attempt to attach to a network via a network edge component, e.g., 5G NR component 494, etc., wherein the network can comprise a next generation component (NGC) component 495, etc. As another example, UE 410 can attempt to attach to a network via a network edge component, e.g., 4G evolved NodeB (eNB) component 497, etc., wherein the network can comprise an evolved packet core (EPC) component 498, etc. In an aspect, where one network can be preferable to another network, for example 5G can be preferable to 4G, the attempted connection can be preferentially steered to a fist network, e.g., 5G, etc., and then can failover to a second network, e.g., 4G, etc. The attempt to attach to a network can fail for various reasons that can comprise a failure of UE 410 to attach to 5G NR component 494, a failure of 5G NR component 494 to attach to NGC component 495, a failure of NGC component 495 to connect to other network component(s), 5G NR component 494 and/or NGC component 495 can be underperforming, overburdened, filtering or otherwise selectively allowing attachment based on a determined criterion, etc. UE 410 can attempt to attach to the network via attachment request signal 491. In an embodiment, attachment request signal 491 can be accessed via a transmission, e.g., via radio component 440 of UE 410, etc. Where UE 410 successfully attaches to the network, expected response signal 492 can be returned. However, where the attaching of UE 410 to the network fails, expected response signal 492 can be absent. Moreover, where the attaching of UE 410 to the network fails, UE 410 can failover to another network, e.g., via failover attachment request signal 496, facilitating an attempt to connect to the other network, for example, via eNB component 497 and/or EPC component 498.

Connection behavior component 420 of system 400 can determine that the attaching of UE 410 to the network has failed. In an embodiment, connection behavior component 420 can indicate a count of failed attachment attempts. In another embodiment, connection behavior component 420 can indicate a type of attachment that was attempted. In a further embodiment, connection behavior component 420 can indicate a time since a last successful attachment attempt. Protective component 430 of system 400 can cause a protective or prophylactic state that can prevent subsequent attachment attempts. The protective or prophylactic state can be initiated or caused in response to a signal from connection behavior component 420, e.g., a count of failed attempts is determined to satisfy a rule related to initiating the protective or prophylactic state. The prevention of subsequent attachment attempts can continue for a determined period, until a condition is met, while a rule is determined to be satisfied, etc.

In an aspect, system 400 can comprise reset component 450. Reset component 450, similar to connection behavior component 420, protective component 430, etc., can be collocated with UE 410, as illustrated, local to but separate from UE 410, remote from UE 410, etc. Reset component 450 can facilitate returning to a default value for based on a state change as is disclosed elsewhere herein. Moreover, reset component 450 can enable exiting the protective or prophylactic response based on a state change of a user device, UE, e.g., 410, etc., attaching device, etc., for example, a power state, an 'airplane-mode' state, an override value state, a location state, a geographic transition state, etc. As an example, UE can be in a prophylactic response condition as a result of a count of attach attempts being determined to have transitioned a threshold value. Prior to the expiration of the time period corresponding to the example prophylactic response condition, reset component 450 can detect, for example, that UE 410 has undergone a transition into an on state from an off state, e.g., UE 410 has been power cycled, etc. This can result, for example, in reset component 450 initiating a return of UE 410 to a non-prophylactic response condition. Another example can result in exiting a protective state based on reset component 450 determining that UE 410 has moved from a first geographic region to a second geographic region. Other examples will be readily appreciated and are to be considered within the scope of the instant disclosure despite not being explicitly recited for the sake of clarity and brevity.

In view of the example system(s) described above, example method(s) that can be implemented in accordance with the disclosed subject matter can be better appreciated with reference to flowcharts in FIG. 5-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

Figure 5:
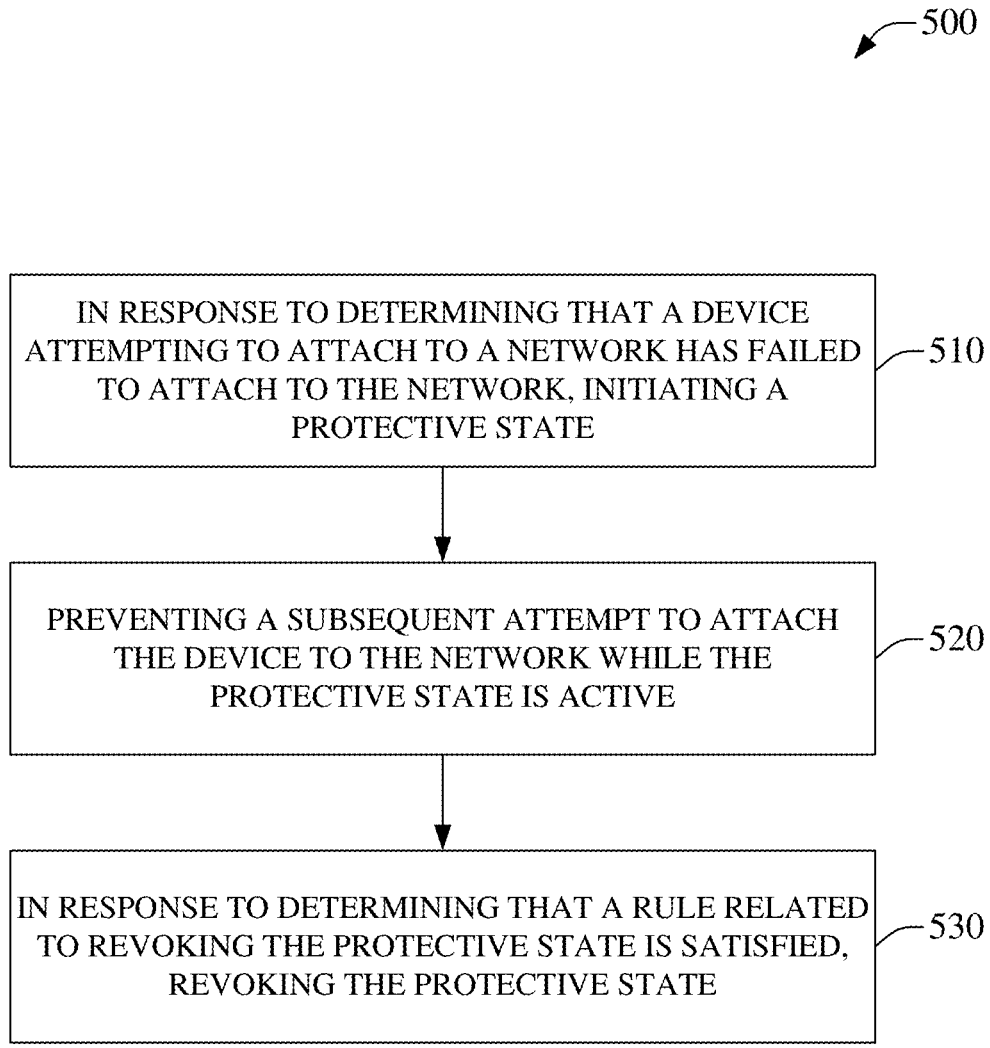
FIG. 5 illustrates an example method facilitating causing a protective response to a failed network attach operation, in accordance with aspects of the subject disclosure.

FIG. 5 is an illustration of an example method 500, which enables causing a protective response to a failed network attach operation, in accordance with aspects of the subject disclosure. At 510, method 500 can comprise initiating a protective state. The protective, or prophylactic state, can provide a network relief from a device seeking to attach to the network in a potentially aggressive manner. In modern and future networks it can be expected that a larger number of devices will seek connection to networks than in conventional technologies. Accordingly, as the number of network attach attempts scales in 5G and other future networks, repetitive and incessant retires of failed attach attempts can affect the performance of network resources. At 510, where an attempt to attach to a network has been determined to have failed, the protective state can be initiated to protect the network where the attaching device can be aggressive. In an example, IoT devices can be low-margin devices that may lack the sophistication of a higher-margin device, e.g., a laptop computer, smartphone, etc., and this lack of sophistication can comprise a more rudimentary scheme for attaching to a network, e.g., the IoT device may simply continually attempt to attach until a successful attachment to the network is achieved. This type of behavior can be guarded against, for example, by including method 500 in a component of the example IoT device to enable initiation of a protective state in response to a determined failed attach attempt. The example IoT device can comprise an off the shelf component, e.g., an off the shelf 5G radio integrated circuit, etc., comprising instructions for performing method 500 allowing access to the protective technology via the off the shelf component and not relying solely on the IoT device developers to program in their own non-aggressive attaching technology.

At 520, method 500 can comprise preventing a subsequent attach attempt. By preventing the device from bombarding the network with one or more subsequent attach requests, method 500 can reduce the burden on the network and device resources. Method 500 can continue to prevent the subsequent attach attempt while the protective state is active. In an aspect, the protective state can be active until determined conditions are met, a rule is determined to be satisfied, etc. Generally embodiments will comprise a self-satisfying exit condition to allow a device to attempt a future attachment without requiring further external stimuli, e.g., an expiration time for the protective state, etc., but some embodiments can remain in an active protected state until an external stimuli is received, for example, receiving an override signal, a reset signal, etc.

At 530, method 500 can comprise revoking the protective state in response to determining that a rule has been satisfied. At this point method 500 can end. The rule can be related to revocation of the protective state, e.g., the rule can be satisfied by criteria related to terminating the active protection state. As an example, a rule can be related to a determined time that the protection state is to be active. This time can be indicated by a variable that can be assigned a default value, e.g., a manufacturer can designate a default time to keep a protective state active. Moreover, the default time can, in some embodiments, be reprogrammable. As an example, the default time can be a first default time which can be modified to a second default time. Moreover, a default time can adapted to a non-default time, e.g., the second default time can further be adapted into a first volatile time. The first volatile time can then be adapted in to subsequent volatile times in some embodiments of the disclosed subject matter. As an example, an IoT device can comprise a component having a first default time set by a first manufacturer of the component. A second manufacturer of the example IoT device can change the first default time to a second default time before selling on the IoT device. In use, the second default time of the example IoT device can be adapted to a first volatile time, e.g., a network can signal the example IoT device to use a first volatile time instead of the second default time. This can allow the network operator a margin of control over the behavior of devices, e.g., the example IoT device, etc., attaching to their network, e.g., by adjusting the period of the protective state. It will be appreciated that other criteria can also satisfy the rule related to revoking the protective state, e.g., a criteria can relate to revocation upon termination of an application in execution, a criteria can relate to revocation upon transitioning a geographic boundary, etc., and all such permutations of method 500 are considered within the scope of the instant disclosure even where not explicitly recited.

Figure 6:
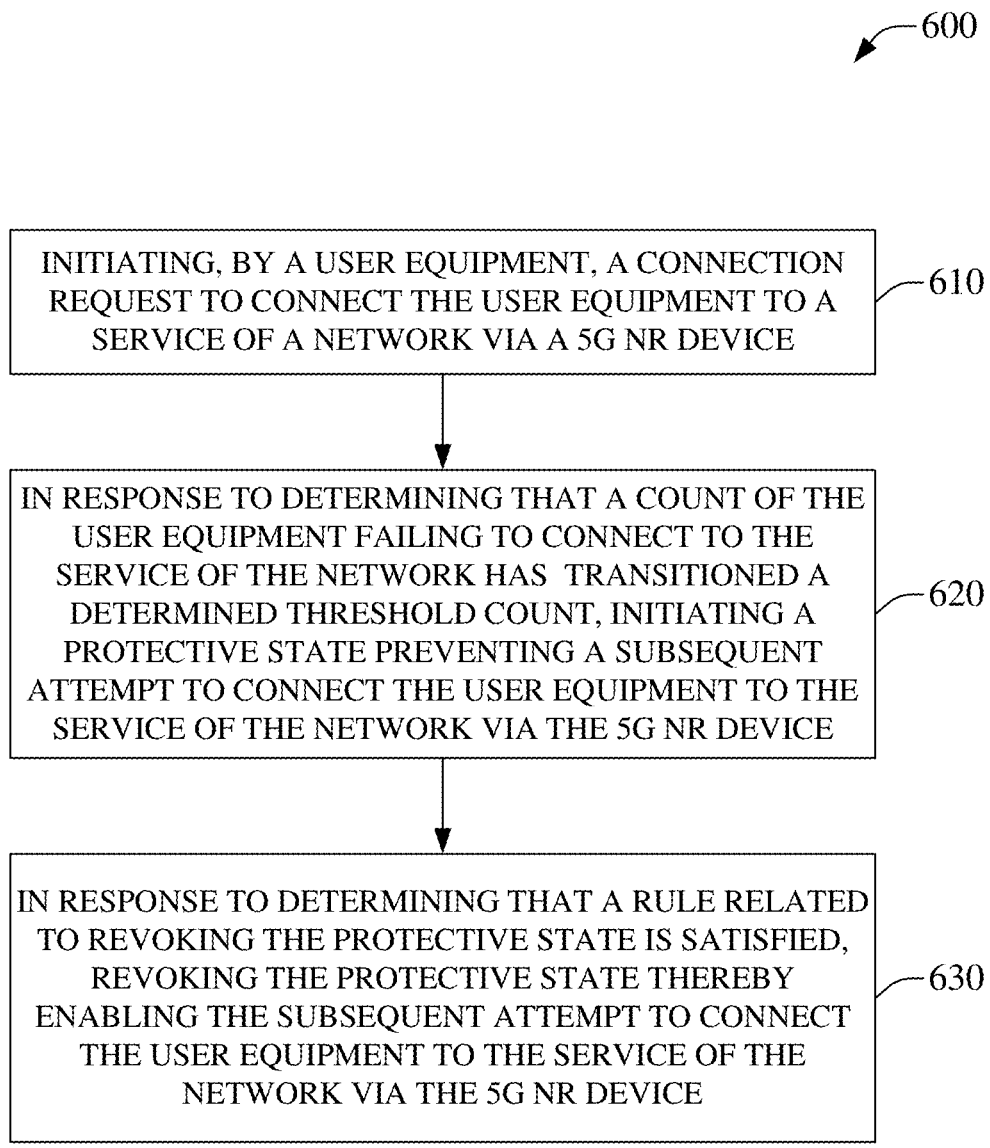
FIG. 6 is an illustration of an example method enabling a protective response to a failed network service request, in accordance with aspects of the subject disclosure.

FIG. 6 is an illustration of an example method 600, which facilitates a protective response to a failed network service request, in accordance with aspects of the subject disclosure. At 610, method 600 can comprise initiating a connection request to connect a user equipment to a network service via a 5G NR device or component. Where the UE successfully connects to the network service, method 600 can end, not illustrated for clarity and brevity. Where the attempted connection to the network service via the 5G NR device fails, method 600 can continue to 620.

At 620, method 600 can comprise determining that a count of the UE failing to connect to the service of the network, e.g., a count of the failed attempts to connect, has transitioned a determined threshold count. In response to the determining that the count has transitioned the threshold count, method 600 can initiate a protective state. The protective state can prevent a subsequent attempt to connect the UE to the service of the network via the 5G NR device. In an aspect, the threshold count can be a default threshold count. The default threshold count can be changed to another count, e.g., from a first default threshold count to a second default threshold count, from the default threshold count to a volatile threshold count, etc.

Method 600, at 630, can comprise revoking the protective state in response to determining that a rule has been satisfied. At this point method 600 can end. The rule can be related to revocation of the protective state, e.g., the rule can be satisfied by criteria related to terminating the active protection state. As an example, a rule can be a temporal rule based on an in which the protective state is to be active and preventing the subsequent attempt to connect the UE to the network service. As an example, the time can be a first default time. The example first default time can be modified to a second default time. Moreover, a default time can adapted to a volatile time, e.g., the first or the second default time can further be adapted to a first volatile time. The first volatile time can then be adapted to a further subsequent volatile time. It will be appreciated that other criteria can also satisfy the rule related to revoking the protective state, e.g., a criteria can relate to revocation upon termination of an application in execution, a criteria can relate to revocation upon transitioning a geographic boundary, etc.

Figure 7:
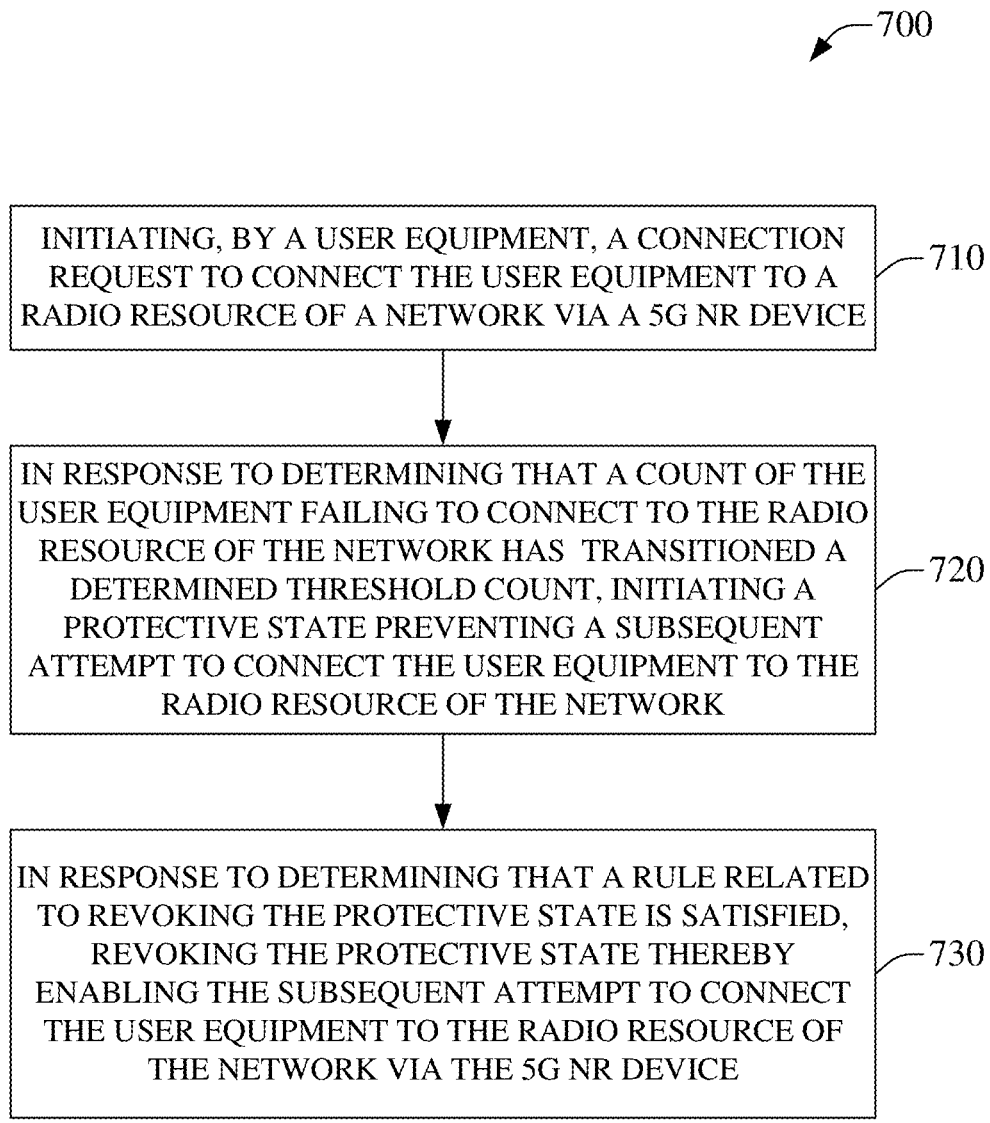
FIG. 7 illustrates an example method facilitating a protective response to a failed radio resource request, in accordance with aspects of the subject disclosure.

FIG. 7 illustrates example method 700 facilitating a protective response to a failed radio resource request, in accordance with aspects of the subject disclosure. Method 700, at 710, can comprise initiating a connection request to connect a user equipment to a radio resource of a network via a 5G NR device or component. Where the UE successfully connects to the radio resource of the network, method 700 can end. Where the attempted connection to the radio resource of the network via the 5G NR device fails, method 700 can continue to 720.

At 720, method 700 can comprise determining that a count of the UE failing to connect to the radio resource of the network, e.g., a count of the failed attempts to connect, has transitioned a determined threshold count. In response to the determining that the count has transitioned the threshold count, method 700 can initiate a protective state. The protective state can prevent a subsequent attempt to connect the UE to the radio resource of the network via the 5G NR device. In an aspect, the threshold count can be a default threshold count. The default threshold count can be changed to another count, e.g., from a first default threshold count to a second default threshold count, from the default threshold count to a volatile threshold count, etc.

Method 700, at 730, can comprise revoking the protective state in response to determining that a rule has been satisfied. At this point method 700 can end. The rule can be related to revocation of the protective state, e.g., the rule can be satisfied by criteria related to terminating the active protection state. As an example, a rule can be a temporal rule based on an in which the protective state is to be active and preventing the subsequent attempt to connect the UE to the network service. As an example, the time can be a first default time. The example first default time can be modified to a second default time. Moreover, a default time can adapted to a volatile time, e.g., the first or the second default time can further be adapted to a first volatile time. The first volatile time can then be adapted to a further subsequent volatile time. It will be appreciated that other criteria can also satisfy the rule related to revoking the protective state, e.g., a criteria can relate to revocation upon termination of an application in execution, a criteria can relate to revocation upon transitioning a geographic boundary, etc.

Figure 8:
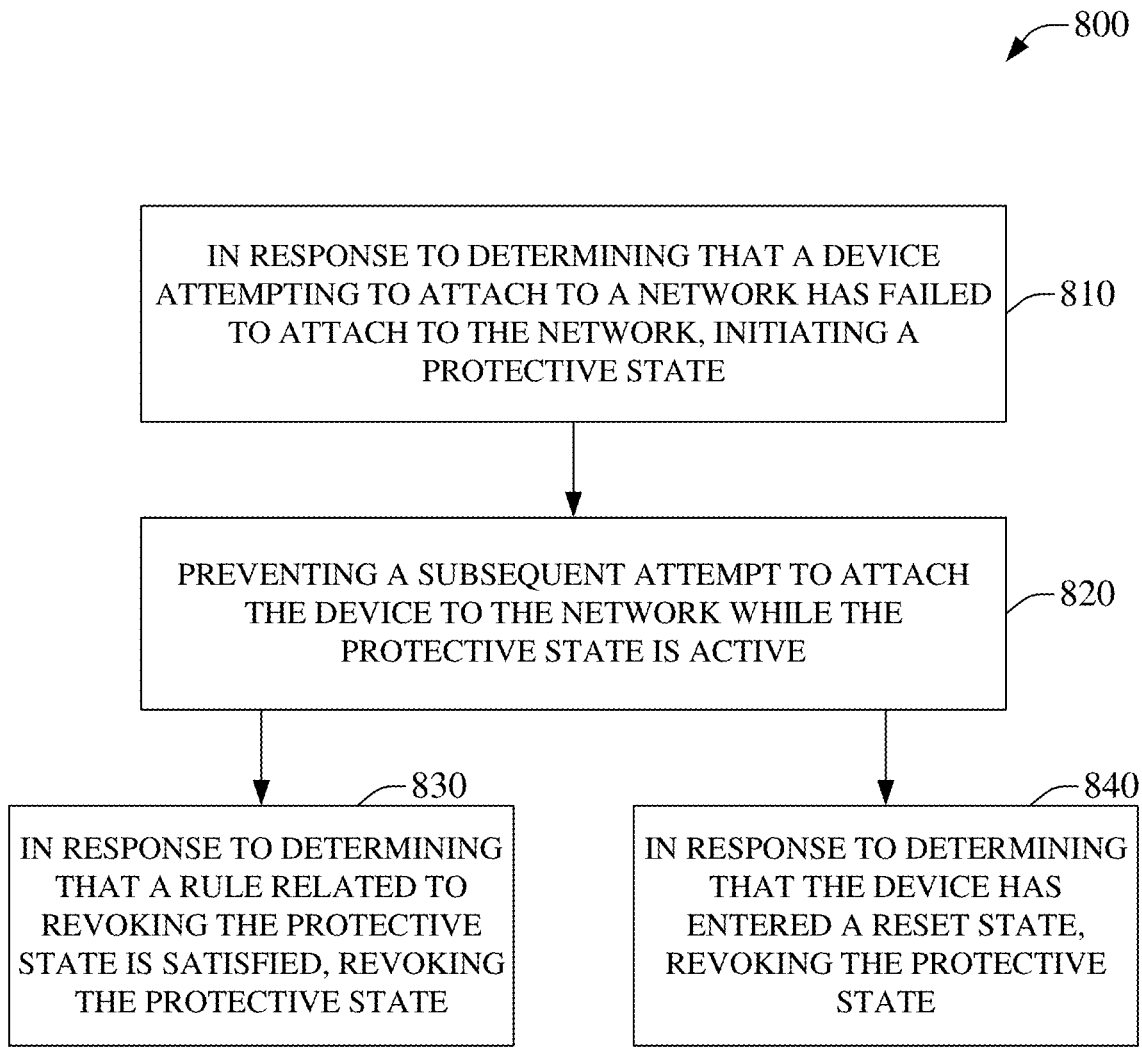
FIG. 8 illustrates an example method enabling initiation of a protective response to a failed attach operation and subsequent revocation of the protective state in response to an occurrence of a reset state, in accordance with aspects of the subject disclosure.

FIG. 8 illustrates example method 800 enabling initiation of a protective response to a failed attach operation and subsequent revocation of the protective state in response to an occurrence of a reset state, in accordance with aspects of the subject disclosure. Method 800, at 810, can comprise initiating a protective state. The protective state can provide a network relief from potentially aggressive device attaching behavior. As the number of network attach attempts scales, e.g., in 5G and other advanced networks, frequent attempts to attach the same device in light of an earlier failed attach attempt can affect the performance of resources of the network. At 810, where an attempt to attach to a network has been determined to have failed, the protective state can be initiated to protect the network where the attaching device can be aggressive.

At 820, method 800 can comprise preventing a subsequent attach attempt. Method 800 can thereby reduce a burden on network resources and device resources by preventing the device from making further repeated attempts to attach to the network, more particularly in an aggressive manner that can involve frequent, constant, repetitive, or continuous repeat attempts to attach after a failed attempt to attach. Method 800 can continue to prevent the subsequent attach attempt while the protective state is active. In an aspect, the protective state can remain active for a period or until criteria satisfy a rule, for example, receiving an override signal, a reset signal, etc.

At 830, method 800 can comprise revoking the protective state in response to determining that a rule has been satisfied. At this point method 800 can end. The rule can be related to revocation of the protective state, e.g., the rule can be satisfied by criteria related to terminating the active protection state. As an example, a rule can be a time-based rule which can revoke the protective state after a determined period. As an example, the time can be a first default time. The example first default time can be modified to a second default time. Moreover, a default time can adapted to a volatile time, e.g., the first or the second default time can further be adapted to a first volatile time. The first volatile time can then be adapted to a further subsequent volatile time.

At 840, method 800 can comprise revoking the protective state in response to determining that the device has entered a reset state. The device entering the reset state can therefore cause revocation of the protective state in an alternative manner from revocation as illustrated at 830 of method 800. In an embodiment, the reset state can be triggered by user input. As an example, a user can power cycle the device, wherein the device powering back on can be the reset state. As another example, a user can enter and then exit 'airplane mode,' e.g., altering power to a radio of the device, which can be the reset state. In a further example, a user can cause the device to attach to a second network, which can be the reset state for protection of the first network, e.g., connecting to a different second network can result in allowing the device to attempt connect to the first network again. Numerous other examples of user input that triggers the reset state are readily appreciated and included in the scope of the disclosed subject matter despite not being explicitly recited for brevity and clarity. In an embodiment, the reset state can be triggered by other criteria, e.g., location, movement, device state, etc. As an example, an application moving from foreground operation to background operation, an application starting execution, an application terminating execution, etc., can be device states that trigger the device entering the reset state. As another example, a device attaching to a 4G/LTE network after failing to attach to a 5G NR device (e.g., under option 4 of proposed 3GPP TR 38.801, etc.) can be deemed to put the device into the reset state. As a further example, the device changing location or transitioning a geographic boundary can be treated as the device entering the reset state. As an additional example, the device can receive an override signal, e.g., from the network operator, etc., that can cause the device to enter the reset state, e.g., the device can be placed in the protective state due to too many failed attach attempts, such as where the network is being repaired, but the network operator can send an override signal, such as when repairs are complete, to allow devices to again attempt to attach to the network.

Figure 9:
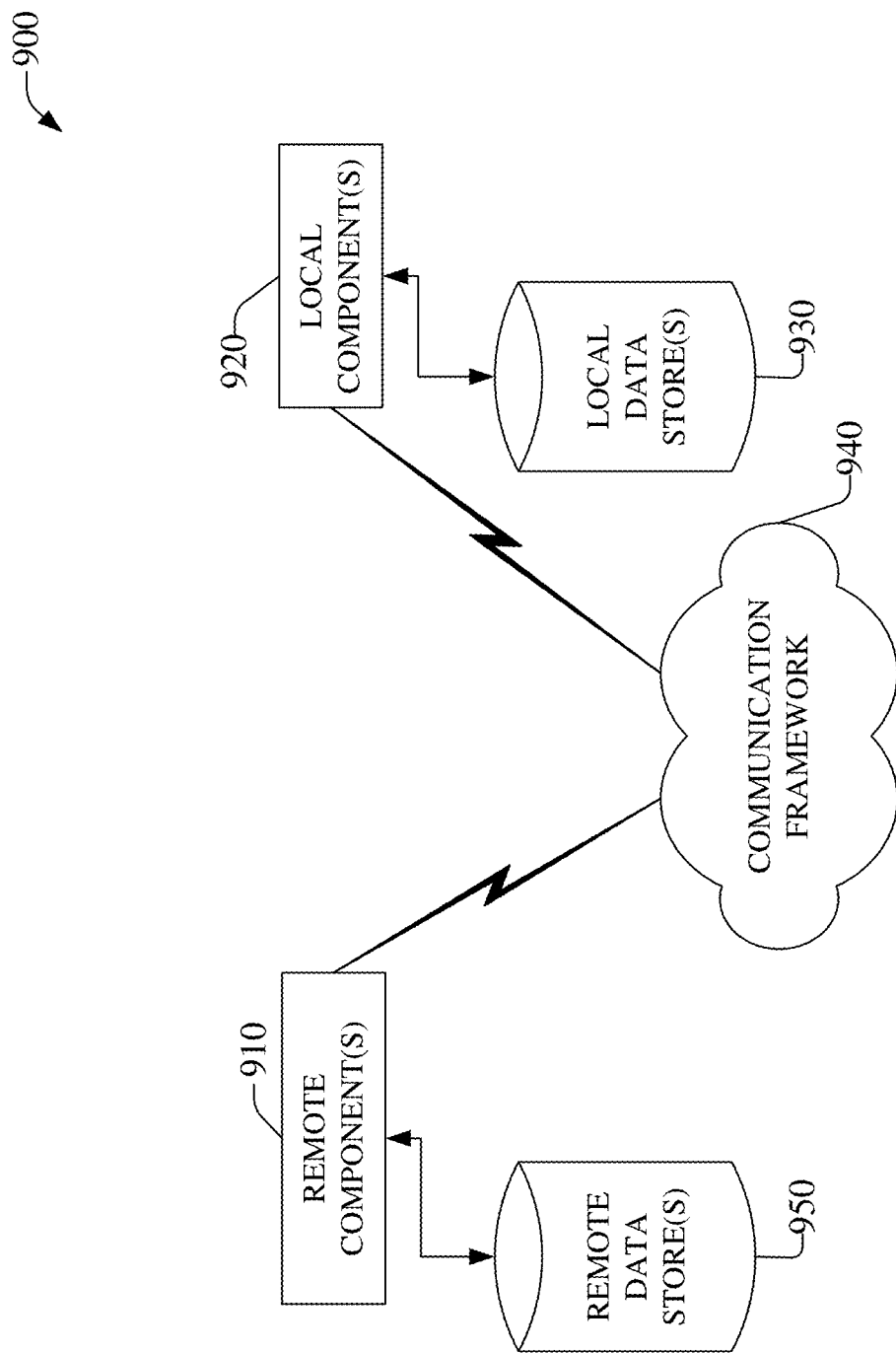
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can comprise network component 190, NGC component 295, 495, etc., 5G NR component 294-494, etc., EPC component 498, etc., 4G eNB component 497, etc., or other component(s) or device(s) that are located remotely from protective component 130, 430, SID component 230, RID component 330, etc. In some embodiments, e.g., where protective component 130, 430, SID component 230, RID component 330, etc., are not comprised in or located proximate to UE 110-410, etc., UE 110-410, etc., can also be considered remote component(s) 910.

The system 900 also comprises one or more local component(s) 920. The local component(s) 920 can be hardware and/or software (e.g., threads, processes, computing devices). In some embodiments, local component(s) 920 can comprise protective component 130, 430, SID component 230, RID component 330, etc., component 120, 220, 320, 420, etc., or other component(s) or device(s) that are located local to protective component 130, 430, SID component 230, RID component 330, etc., e.g., UE 110-410 can be local component(s) 920 where protective component 130, 430, SID component 230, RID component 330, etc., are collocated or comprised in UE 110-410, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As examples, a count of failed attachment attempts can be stored at component 120-420, etc., e.g., on local data storage device(s) 930, etc., to facilitate determining initiation of a protective state via protective component 130, 430, SID component 230, RID component 330, etc., reset rules can be received by reset component 450, etc., from a remote rule store, e.g., rules stored on remote data storage device(s) 950, etc., or nearly any other information can be stored on a local or remote storage device for access by any other local or remote component germane to the herein disclosed subject matter.

Figure 10:
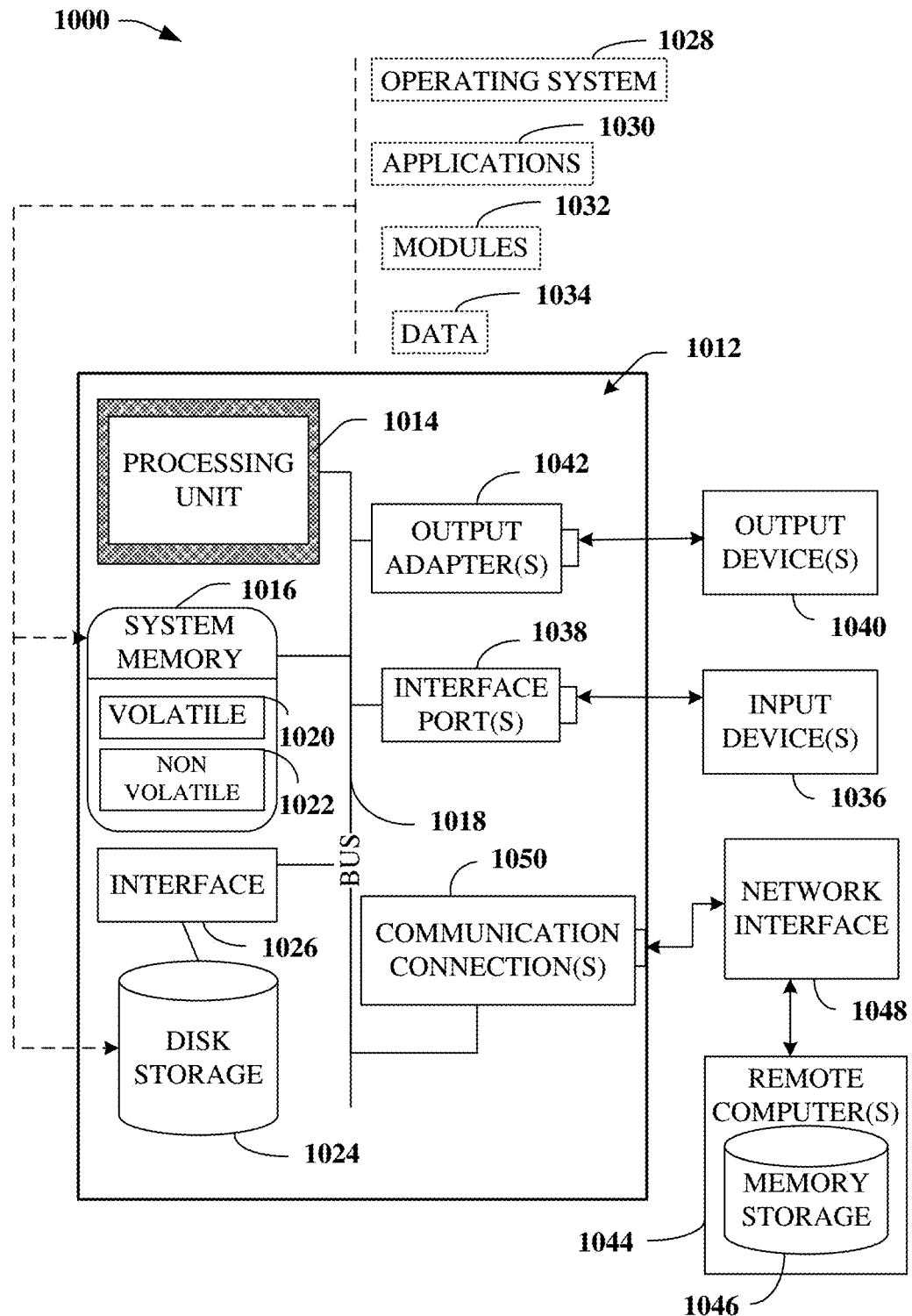
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in network component 190, NGC component 295, 495, etc., 5G NR component 294-494, etc., EPC component 498, etc., 4G eNB component 497, etc., protective component 130, 430, SID component 230, RID component 330, etc., UE 110-410, etc., or nearly any other device, can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synch-Link dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising initiating a slice event based on a slice event instruction corresponding to analysis of network analytics for various portions of a network, and can be based on rules and/or inferences related to the analysis of the network analytics.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted elsewhere herein, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," "5G network radio," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows. Data or signal information exchange can comprise technology, such as, single user (SU) multiple-input and multiple-output (MIMO) (SU MIMO) radio(s), multiple user (MU) MIMO (MU MIMO) radio(s), long-term evolution (LTE), LTE time-division duplexing (TDD), global system for mobile communications (GSM), GSM EDGE Radio Access Network (GERAN), Wi Fi, WLAN, WiMax, CDMA2000, LTE new radio-access technology (LTE-NX), massive MIMO systems, etc.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to authenticating a user-identity to a user-account. Authentication can, in some embodiments, refer to determining whether a user-identity requesting a service from a telecom network is authorized to do so within the network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device, comprising:
a processor; and
a memory that stores executable instructions that, when executed by the processor, facilitate performance of operations, comprising:
in response to receiving an indication of a failed request condition related to establishing a connection between a user equipment and network equipment, initiating a network prophylactic behavior, wherein the indication of the failed request condition is based on a connection condition satisfying a rule related to attempted connection behavior of the user equipment towards the network equipment, and wherein the connection is a first connection to a network service; and
in response to the network prophylactic behavior being determined to satisfy a rule, suspending the network prophylactic behavior.

2. The device of claim 1, wherein the network prophylactic network behavior is a temporal network prophylactic behavior.

3. The device of claim 2, wherein the connection condition corresponds to a number of failed connection requests occurring within a determined period, and wherein in response to determining satisfaction of a temporal rule based on the indication of the failed request condition, the temporal network prophylactic behavior causes the user equipment to prevent generation of a request for the connection.

4. The device of claim 3, wherein the determined period is updatable from a default value.

5. The device of claim 1, wherein the network prophylactic network behavior is an incremental network prophylactic behavior.

6. The device of claim 5, wherein the connection condition corresponds to a count of failed connection requests occurring since a last successful connection request, and wherein in response to determining satisfaction of a count rule based on the indication of the failed request condition, the incremental network prophylactic behavior causes the user equipment to prevent generation of a request for the connection.

7. The device of claim 6, wherein the count of failed connection requests occurring since a last successful connection request corresponds to at least one failed service request.

8. The device of claim 6, wherein the count of failed connection requests occurring since a last successful connection request corresponds to at least one failed radio resource connection request.

9. The device of claim 1, wherein the indication is a first indication, and wherein the operations further comprise:
in response to the receiving a second indication of a device state change, suspending the network prophylactic behavior.

10. The device of claim 9, wherein the second indication of the device state change corresponds to altering a power state of a radio of the device.

11. The device of claim 10, wherein altering the power state of the radio of the device comprises placing the radio in airplane mode and then removing the radio from the airplane mode.

12. The device of claim 10, wherein altering the power state of the radio of the device comprises decreasing power supplied to the radio and then increasing the power supplied to the radio.

13. A method, comprising:
determining, by a system comprising a processor and a memory, a count of instances of a user equipment failing to successfully initiate an attachment to network equipment, wherein the attachment results in a first connection of the user equipment to a network service; and
initiating, by the system, a protective state in the user equipment based on determining that the count of instances has transitioned a threshold count, wherein the protective state stops a subsequent attempt to attach the user equipment to the network equipment.

14. The method of claim 13, wherein the threshold count is a first default threshold count.

15. The method of claim 14, wherein the first default threshold count is updateable to another threshold count selected from a group of threshold counts comprising a second default threshold count and a volatile threshold count.

16. The method of claim 13, wherein determining the count of instances of the user equipment failing to successfully attach to the network equipment comprises the network equipment device being 5G new radio equipment communicatively coupled to a next generation core equipment, and wherein the 5G new radio equipment is deployed in accordance with standalone radio access network option 2 of third generation partnership project technical report 38.801.

17. The method of claim 13, wherein determining the count of instances of the user equipment failing to successfully attach to the network equipment comprises the network equipment being 5G new radio equipment communicatively coupled to next generation core equipment, and wherein the 5G new radio equipment is deployed in accordance with standalone radio access network option 4 of third generation partnership project technical report 38.801.

18. A machine-readable storage medium, comprising executable instructions that, when executed by a processor, facilitate performance of operations, comprising:
determining a count of instances of a device failing to successfully establish an attachment between network equipment and the device, wherein the attachment supports a first connection to a network service;
preventing a subsequent attempt after the instances occurred to attach the device to the network device via initiating a protective state in the device, wherein the initiating the protective state is based on determining that the count of instances has transitioned a threshold count; and
in response to determining that the protective state is to be revoked, enabling the subsequent attempt to attach the device to the network equipment, wherein the determining that the protective state is to be revoked is based on an indicator selected from a group of indicators comprising an elapsed time indicator, a current time indicator, a device location indicator, a device movement indicator, an override signal indicator, a device power state indicator, a device radio power state indicator, and a device network attachment indicator.

19. The machine-readable storage medium of claim 18, wherein the threshold count is a first updateable default threshold count, wherein the first updateable default threshold count is updateable to a second updateable default threshold count, wherein the second updateable default threshold count is updateable to a first volatile threshold count, and wherein the first updateable default threshold count is updateable to a second volatile threshold count.

20. The machine-readable storage medium of claim 19, wherein an updated threshold count based on threshold count is resettable to a default threshold count selected form the group comprising the first updateable default threshold count and the second updateable default threshold count.

\* \* \* \* \*